(12) United States Patent
Torres et al.

(10) Patent No.: US 11,207,643 B2
(45) Date of Patent: Dec. 28, 2021

(54) ENERGY EFFICIENT REMOVAL OF CO2 FROM AIR BY INTEGRATING WITH H2 GENERATION

(71) Applicant: PALO ALTO RESEARCH CENTER INCORPORATED, Palo Alto, CA (US)

(72) Inventors: Francisco E. Torres, San Jose, CA (US); Eugene Shin Ming Beh, Portola Valley, CA (US); Jessica Louis Baker Rivest, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 16/924,573

(22) Filed: Jul. 9, 2020

(65) Prior Publication Data
US 2020/0338498 A1    Oct. 29, 2020

Related U.S. Application Data

(62) Division of application No. 15/941,442, filed on Mar. 30, 2018, now Pat. No. 10,981,114.
(Continued)

(51) Int. Cl.
*B01D 53/96* (2006.01)
*B01D 53/62* (2006.01)
(Continued)

(52) U.S. Cl.
CPC ....... *B01D 53/965* (2013.01); *B01D 53/1425* (2013.01); *B01D 53/1475* (2013.01);
(Continued)

(58) Field of Classification Search
CPC .............. B01D 53/965; B01D 53/1425; B01D 53/1475; B01D 53/1493; B01D 53/62;
(Continued)

(56) References Cited

U.S. PATENT DOCUMENTS

| | | |
|---|---|---|
| 2013/0277231 A1 | 10/2013 | Greenberg |
| 2015/0147233 A1 | 5/2015 | Toyama et al. |

(Continued)

OTHER PUBLICATIONS

Eisaman, M.D., "Indirect ocean capture of atmospheric CO2: Part II. Understanding the cost of negative emissions," International Journal of Greenhouse Gas Control, vol. 70 (Mar. 2018).
(Continued)

*Primary Examiner* — Anita Nassiri-Motlagh
(74) *Attorney, Agent, or Firm* — Miller Nash LLP

(57) ABSTRACT

A method of removing carbon dioxide from an atmosphere and generating hydrogen includes capturing carbon dioxide from the atmosphere in an alkaline capture solution, sending the alkaline capture solution to a series of electrolyzers in a $CO_2$-rich path, wherein each electrolyzer cell raises the acidity of the input $CO_2$-rich solution to produce an acidified $CO_2$-rich solution, removing carbon dioxide from the acidified $CO_2$-rich solution at a carbon dioxide removal unit operation to produce a $CO_2$-poor solution, sending the $CO_2$-poor solution to the series of electrolyzers in a return path, wherein each electrolyzer raises the alkalinity of the return $CO_2$-poor solution to produce a basified $CO_2$-poor solution, wherein a difference in pH between the $CO_2$-rich solution and the $CO_2$-poor solution within each electrolyzer is less than 3, and returning the basified $CO_2$-poor solution to the carbon dioxide capture unit operation.

18 Claims, 7 Drawing Sheets

Related U.S. Application Data

(60) Provisional application No. 62/628,069, filed on Feb. 8, 2018.

(51) Int. Cl.
  *B01D 53/78* (2006.01)
  *B01D 53/14* (2006.01)
  *C25B 9/23* (2021.01)
  *C01B 3/00* (2006.01)
  *C25B 1/04* (2021.01)
  *C25B 9/73* (2021.01)

(52) U.S. Cl.
  CPC .......... *B01D 53/1493* (2013.01); *B01D 53/62* (2013.01); *B01D 53/78* (2013.01); *C01B 3/00* (2013.01); *C25B 1/04* (2013.01); *C25B 9/23* (2021.01); *C25B 9/73* (2021.01); *B01D 2251/304* (2013.01); *B01D 2251/306* (2013.01); *B01D 2251/604* (2013.01); *B01D 2251/606* (2013.01); *B01D 2256/16* (2013.01); *B01D 2257/504* (2013.01); *B01D 2258/0283* (2013.01); *B01D 2258/06* (2013.01)

(58) Field of Classification Search
  CPC .............. B01D 53/78; B01D 2251/304; B01D 2251/306; B01D 2251/604; B01D 2251/606; B01D 2256/16; B01D 2257/504; B01D 2258/0283; B01D 2258/06; C01B 3/00; C25B 1/10; C25B 9/10
  USPC ........................................................ 423/232
  See application file for complete search history.

(56) References Cited

U.S. PATENT DOCUMENTS

2017/0326497 A1 11/2017 Verbakel et al.
2018/0028962 A1 2/2018 Hatton et al.
2019/0240621 A1 8/2019 Torres et al.

OTHER PUBLICATIONS

M. McDonald and M. Freund, "Graphene Oxide as a Water Dissociation Catalyst in the Bipolar Membrane Interfacial Layer," Applied Materials & Interfaces, 6(16):13790-13797, 2014.

M. McDonald et al., "Use of Bipolar Membranes for Maintaining Steady-State pH Gradients in Membrane-Supported, Solar-Driven Water Splitting," ChemSusChem, 7:3021-3027, Sep. 22, 2014.

Huynh et al., "Design of Template-Stabilized Active and Earth-Abundant Oxygen Evolution Catalysts in Acid," Chem. Sci. 8(7);4779-4794, 2017.

Roger et al., "Earth-abundant catalysts for electrochemical and photoelectrochemical water splitting," Nature Reviews: Chemistry,1:1-13, 2017.

S. Stucki, A. Schuler, M. Constantinescu, "Coupled CO2 recovery from the atmosphere and water electrolysis: Feasibility of a new process for hydrogen storage", Int. J. Hydrogen Energy, 20(8):653-663, 1995.

Sources of Greenhouse Gas Emissions, printed May 9, 2018 and found at https://www.epa.gov/ghgemissions/sources-greenhouse-gas-emissions.

Alonso et al., "Strategies to address risks of platinum scarcity for supply chain downstream firms," Sustainable Sys. Technology, IEEE International Symposium May 18-20, 2009.

Renewable Energy to Fuels Through Utilization of Energy Dense Liquids (REFUEL) Program Overview, printed May 9, 2018 and found at https://arpa-e.energy.gov/sites/default/files/documents/files/REFUEL_ProgramOverview.pdf.

Foghorn, printed May 9, 2018 and found at http://www.x.company/explorations/foghorn/.

M. McDonald and M. Freund, "Graphene Oxide as a Water Dissociation Catalyst in the Bipolar Membrane Interfacial Layer," Supporting Information, Dept. of Chem., Univ. Manitoba.

Corrigendum, ChemSusChem Contents, McDonald et al., "Use of Bipolar Membranes for Maintaining Steady-State pH Gradients in Membrane-Supported, Solar-Driven Water Splitting," ChemSusChem, 7:3021-3027, Sep. 22, 2014.

ENERGY EFFICIENT REMOVAL OF CO2 FROM AIR BY INTEGRATING WITH H2 GENERATION

RELATED CASES

This application is a divisional application of U.S. patent application Ser. No. 15/941,442, filed Mar. 30, 2018, which claims priority to and the benefit of U.S. Provisional Application No. 62/628,069 filed Feb. 8, 2018, which are incorporated herein by reference in their entirety.

TECHNICAL FIELD

This disclosure relates to removal of carbon dioxide from an atmosphere, more particularly by removing carbon dioxide from an atmosphere using water electrolysis, which produces hydrogen.

BACKGROUND

Carbon dioxide continues to build up in the environment. According to the National Oceanic and Atmospheric Administration (NOAA), the growth of carbon dioxide in the Earth's atmosphere was 3 parts per million (ppm) per year in 2015 and 2016, and 2 ppm in 2017. Techniques to remove carbon dioxide from the air have become a critical area of research.

One approach involved the use of bipolar membrane electrodialysis (BPMED). BPMED uses electrochemistry and has the potential of efficiencies in the 90% range. BPMED devices use ion exchange membranes to separate ionic species in solution when a stack of membranes receives a voltage. One process of BPMED produced concentrated acid which the process then added to a bicarbonate rich stream to desorb $CO_2$. However, some of these efforts reached the conclusion that the costs, including those of pumping and electrodialysis, were too high even for the best-case scenario [Eisaman, M. D., International Journal of Greenhouse Gas Control (2018), https://doi.org/10.1016/j.ijggc.2018.02.020].

A process and apparatus are still needed to remove $CO_2$ from the earth's atmosphere that has relatively low costs, high efficiencies and relatively low, or even negative, emissions.

SUMMARY

According to aspects illustrated here, there is provided a method of removing carbon dioxide from an atmosphere and generating hydrogen that includes capturing carbon dioxide from an atmosphere in an alkaline capture solution, sending the alkaline capture solution to a series of electrolyzers in a $CO_2$-rich path, wherein each electrolyzer cell raises the acidity of the input $CO_2$-rich solution, removing carbon dioxide from the acidified $CO_2$-rich solution at a carbon dioxide removal unit operation to produce a $CO_2$-poor solution, sending the $CO_2$-poor solution to the series of electrolyzers in a return path, wherein each electrolyzer raises the alkalinity of the return $CO_2$-poor solution; and returning the basified $CO_2$-poor solution to the carbon dioxide capture unit operation.

DETAILED DESCRIPTION OF THE EMBODIMENTS

Figure 1:
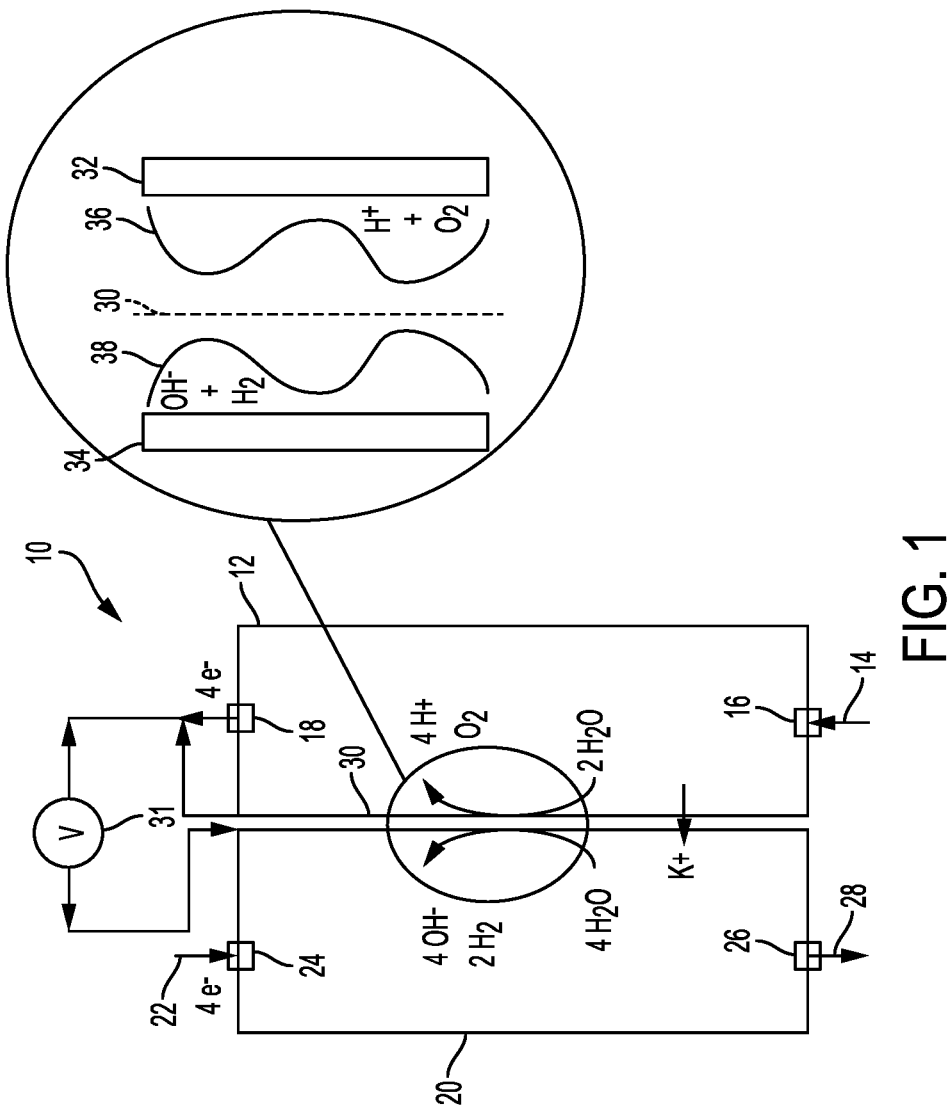
FIG. 1 shows an embodiment of an electrolyzer.

A previous approach for removal of $CO_2$ from the atmosphere involving BiPolar Membrane ElectroDialysis (BPMED) exhibited very large $I^2R$ losses at the current densities required for a cost efficient electrodialysis process. For example, the resistivity for one commercially available bipolar membrane is ~0.0011-0.0023 Ohm*$m^2$. At current densities of 1-3 kA/$m^2$, the resulting overpotential is as follows:

| Resistivity (Ohm*$m^2$) | Current Density (kA/$m^2$) | $I^2R$ overpotential (V) |
|---|---|---|
| .0011 | 1 | 1.1 |
| .0011 | 3 | 3.3 |
| .0023 | 1 | 2.3 |
| .0023 | 3 | 6.9 |

In contrast, the potential corresponding to the thermodynamic free energy required to produce pure $CO_2$ at 5 atmospheres (atm) from 400 parts per million (ppm) atmospheric $CO_2$ is:

$$\frac{RT}{2F}\ln\left(\frac{5 \text{ atm}}{0.0004 \text{ atm}}\right) = 0.12 \text{ V},$$

assuming a two-electron process such as conversion of carbonate ($CO_3^-$) to $CO_2$ by reaction with H+, which will be discussed in more detail further. A desired range of overpotential for the embodiments here is no more than 2-4× the thermodynamic minimum, defined here as the thermodynamic free energy set out above, so the range of 1.1-6.9 V is unacceptable.

Another issue with BPMED lies in the voltage required to separate water into H+ and OH− at a reasonable current density. To achieve a reasonable current density with BPMED, the concentration of H+ within the cation exchange layer and the OH− concentration within the anionic exchange layer of the bipolar membrane must be high. Without high ion concentrations the $I^2R$ losses for ion conduction through the bipolar membrane will be even higher than those in the table above, since conductivity scales with the number concentration of charge carriers.

However, high concentrations of H+ and OH− in the respective halves of the bipolar membrane correspond to a large pH difference across the junction, and splitting water requires 59.2 mV/pH. This leads to larger than desired voltages to split water. For example, a Δ pH of 14 corresponds to a required voltage of 0.83 V, not including resistive losses across the membrane (M. McDonald and M. Freund, *Applied Materials & Interfaces*, 2014, 6, 13790-13797; and M. McDonald, S. Ardo, N. Lewis and M. Freund, *ChemSusChem* 2014, 7, 3021-3027). While this voltage is not as high as those discussed above, a voltage of 0.8 V is significantly higher than the 0.12 V thermodynamic minimum.

A negative emissions technology that removes $CO_2$ from the environment and produces synthetic fuel using $H_2$ generated by renewable energy has high appeal. The process could capture $CO_2$ directly from air, referred to as Direct Air Capture, or from exhaust streams of various combustion processes by absorbing it in a basic solution, such as a $KOH/K_2CO_3/KHCO_3$ solution. After absorption at a high pH, acidifying the solution could release gaseous $CO_2$ for subsequent isolation or use. Using water hydrolysis to generate $H_2$ and simultaneously acidify a solution of absorbed $CO_2$ presents one possibility.

An electrolyzer is a device that performs electrolysis of water. Using electrolyzers powered by renewable electricity to produce hydrogen from water, and then combining the hydrogen with $CO_2$ captured from the environment to produce liquid fuels could mitigate ⅓ of US $CO_2$ emissions, according to the United State Environmental Protection Agency, while still providing the fuels that modern transportations modes require. Renewable energy is energy collected from sources that are renewable on a human timescale, such as sunlight, wind, rain, tides, waves, and geothermal heat, as examples. Achieving this goal on a global scale has barriers, in part because the energy currently needed to remove $CO_2$ remains very high relative to the thermodynamic minimum. In addition, commercial electrolyzers use expensive platinum-group catalysts, and such materials have a limited supply. Electrolyzers use these expensive materials in part because they can survive corrosive pH conditions. The possibility exists that a milder pH process could enable the use of other, less expensive, catalysts.

The electrolysis of water produces oxygen at the anode and hydrogen at the cathode. In acidic water electrolysis, hydronium ions ($H_3O+$, also denoted by the shorthand H+) are produced at the anode as well. In alkaline water electrolysis, hydroxide (OH−) is produced at the cathode. Acid in the form of H+ can release $CO_2$ from a basic carbonate/bicarbonate solution, and OH− can regenerate the basic solution for further $CO_2$ absorption from the environment. A potential synergy from these processes exists.

The embodiments here generate H+ at the anode of the electrolyzer and use it to acidify a $CO_2$-rich stream before $CO_2$ desorption, and generate OH− at the cathode of the electrolyzer and use it to basify the return $CO_2$-poor stream to allow its use for further absorption of $CO_2$ from the environment. In embodiments, a base counterion, typically potassium (K+) or sodium (Na+), completes the circuit by conducting through a cation exchange membrane (CEM) separating the electrodes.

As used here, the term 'electrolyzes' refers to any device that performs electrolysis of water, some of which use a cation exchange membrane. The embodiments here involve some number of electrolyzers connected in series, such that the outputs of one connects to the inputs of the next, etc. The term 'initial electrolyzer' refers to an electrolyzer receiving an alkaline capture stream produced by a carbon capture unit operation, the term 'final electrolyzer' refers to an electrolyzer delivering solution to the carbon removal unit operation, and the term 'return electrolyzer' refers to an electrolyzer receiving depleted solution from the carbon removal unit operation. The first electrolyzer, the final electrolyzer, and the return electrolyzer may be the same electrolyzer, if only one electrolyzer is used. Also, an electrolyzer can be both a final electrolyzer and a return electrolyzer.

The term 'alkaline' in 'alkaline capture stream', 'alkaline depleted stream', and 'alkaline capture solution' refers to the pH being above 7.

The term '$CO_2$-rich path, '$CO_2$-rich stream,' or '$CO_2$-rich flow' refers to the flow of an alkaline capture stream through a series of electrolyzers towards a carbon dioxide removal unit operation, and the term '$CO_2$-poor path,' '$CO_2$-poor stream,' or '$CO_2$-poor flow' refers to the flow of a depleted stream from a carbon dioxide removal unit operation through a return electrolyzer in the series back towards a carbon capture unit operation. A 'depleted stream' is a stream with a lower concentration of dissolved inorganic carbon than the input alkaline capture stream.

FIG. 1 shows an embodiment of an electrolyzer 10 usable in a system to remove $CO_2$ from the environment while generating $H_2$ fuel. In operation, a voltage is applied by a voltage source 31 to electrodes 32 and 34 on either side of a membrane 30. The electrolyzer has a first chamber 12 that receives a flow of an input solution 14 at valve 16. The input solution may be from a carbon capture device or unit operation, if the electrolyzer is the initial electrolyzer in the series, or may be from an adjacent electrolyzer that comes before the current electrolyzer 10 in the series of electrolyzers. The first chamber generates H+ ions due to the electrolysis of water. This causes the input solution to become acidified before exiting the chamber as an initial output solution through valve 18.

The term '$CO_2$-rich output solution' designates that it is an output solution in the $CO_2$-rich path. The solution becomes 'acidified' in that the pH of the solution is lowered in the first chamber, even though the output solution may be classified as basic if one were to measure the pH. The output solution then becomes the input solution for the next electrolyzer in the series, if the electrolyzer is either the initial electrolyzer or a middle electrolyzer, or it flows to a carbon dioxide removal unit operation, if the electrolyzer is a final electrolyzer. In embodiments, the carbon dioxide removal unit operation can be a flash tank with a lower pressure than the final electrolyzer, and the carbon dioxide capture unit operation may be a capture tower.

The electrolyzer has an ion-selective membrane 30, such as a cation exchange membrane, that separates the electrolyzer into the first chamber 12 and the second chamber 20, but allows for exchange of ions. The second chamber 20 receives a return flow 22 at a valve 24 and produces an output flow 28 through valve 26. If the electrolyzer is the return electrolyzer in the series, its input solution consists of the solution after removal of carbon dioxide by the carbon dioxide removal unit operation. The $CO_2$-poor output solution 28 has become 'basified' as it passes through the second chamber, in that its pH is higher, even if it would be considered acidic based upon its pH.

As the solution flows in the $CO_2$-rich path, it becomes more acidic at each electrolyzer. As the solution flows in the $CO_2$-poor path, it becomes more alkaline at each electrolyzer. This integrated process produces both $CO_2$ and $H_2$. In embodiments here, the $CO_2$ and $H_2$ can be feedstock for synthetic fuel synthesis. From a process efficiency view, this integration has the benefit of sharing overpotential inefficiencies across two tasks, meaning the lost energy from each overpotential balances against the combined benefits of hydrogen generation and $CO_2$ capture. The required voltage now consists of the voltage required for water electrolysis plus the small voltage required to isolate $CO_2$, combined into one electrochemical cell.

Using a countercurrent flow of the acidifying and basifying streams through a series of electrolyzers keeps the pH difference across the membrane in each electrolyzer relatively small. This enables energy- and cost-efficient processing. In the limit of a large number of cells in series, the process can approach the efficiency of a 'plug flow' process.

Figure 2:
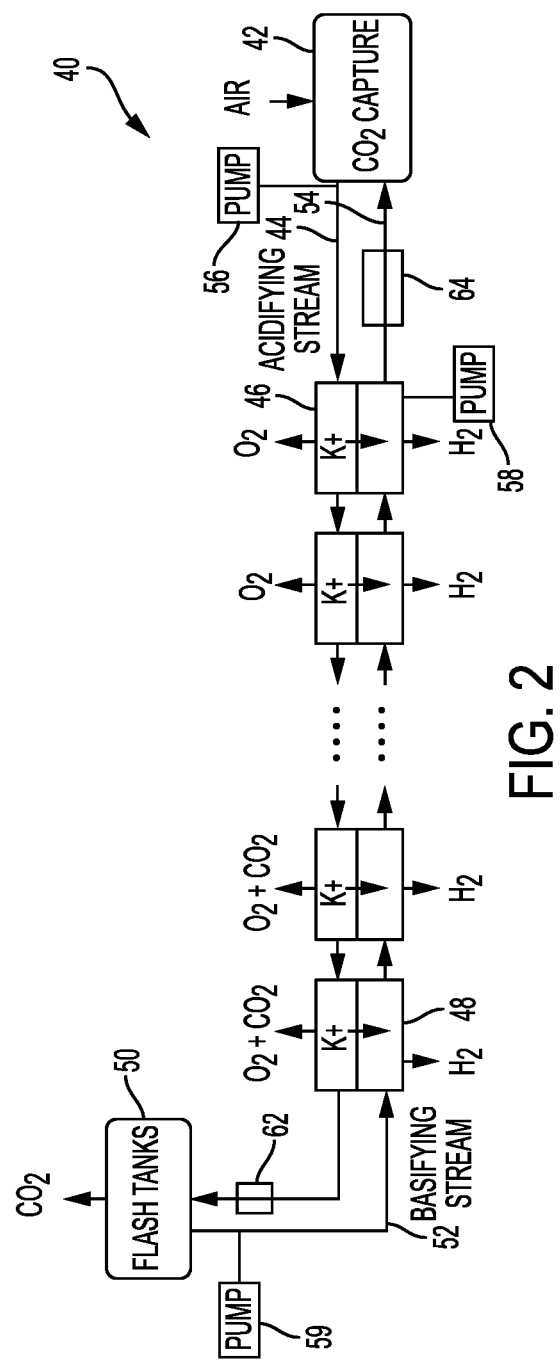
FIG. 2 shows an embodiment of an electrolysis system.

FIG. 2 shows one embodiment of a system for $CO_2$ capture and hydrogen generation 40. FIG. 2 includes a carbon capture device 42, which may be a unit operation open to an atmosphere, where the atmosphere is whatever gaseous environment in which the unit operates. This may be open air, a mixture of gasses, the exhaust conduit of a combustion process, etc. The carbon capture unit captures the $CO_2$ from the atmosphere in an alkaline capture solution, as discussed above. The alkaline capture solution 44, in one embodiment having a pH of 10.6, then flows to a series of electrolyzers, starting with an initial electrolyzer 46. Each electrolyzer in the series raises the acidity of the solution until it reaches a point at which the captured $CO_2$ bubbles out of the capture solution after passing through a final electrolyzer in the series 48 and entering a flash tank 50. As mentioned before, it is possible that the initial electrolyzer, the final electrolyzer, and the return electrolyzer are the same electrolyzer, meaning that the series of electrolyzers is a series of 1.

In one embodiment with 5 electrolyzers in series, the pH of the solution reaches 6.0 at the point where $CO_2$ begins to bubble out of solution. Carbon dioxide sensors, pH sensors, as well as other types of sensors may reside in the electrolyzers, the fluid connections between the electrolyzers, etc., to monitor the various gas and pH levels.

A capture tank of some kind, such as a flash tank 50 removes the $CO_2$ from the solution, returning a solution having a relatively high acidity as one output. This solution then becomes the $CO_2$-poor solution 52 that flows into the series of electrolyzers. At each electrolyzer on the return $CO_2$-poor path, the alkalinity of the solution is raised, and a hydrogen output is produced by the electrolyzers, for use in liquid fuel synthesis or directly as a fuel. In one experiment using the embodiment shown for 5 electrolyzers in series, the return $CO_2$-poor flow reaches a pH of 13.6 at 54 before returning to the capture device 42.

The calculation results above are for this particular embodiment, though one can alter the process variables to optimize for different objectives. For example, the flow rates can increase or decrease to trade off capital v. operating costs. The pH of the capture solution can vary, as can the pressure of the isolated $CO_2$.

In one embodiment, the above pHs result from a large number of cells, for example, nearing the plug flow limit. $CO_2$ is captured in a base solution of 1 M with respect to $K^+$ ions as $KOH+ KHCO_3+K_2CO_3$. At high pH the dissolved $CO_2$ will mostly take the form of carbonate. The pH difference across each cell has been minimized to 0.9-3 pH unit, which enables energy efficient $CO_2$ capture and isolation.

In the embodiment of FIG. 2, the pressure in each cell is greater than the partial pressure of the $CO_2$ for the solution in that cell to keep most of the $CO_2$ in solution. The pressure may be controlled by a system-level pump such as 56 at the beginning of the acidifying stream and 59 at the beginning of the basifying stream, as well as individual pumps such as 58 for each cell to bring the pressure back to the control point. Only one is shown for simplicity. In addition, there may be regenerators of electricity such as 62 and 64 when the pressure drops to degas the $CO_2$ or prior to returning the capture stream to the capture unit operation. The flow driven by the pressure drop can power a regenerator, generating electricity to supplement the main electricity supply for the electrolyzers.

The cells themselves may be designed to contain the high pressures, including materials of construction for sealing and to withstand high pressure drops from a high internal pressure on one side and the external ambient pressure on the other.

In FIG. 2, the $O_2$ stream entrains some $CO_2$. If the $O_2$ stream were merely exhausted back into the environment, the entrained $CO_2$ would be released back into the environment as well, which reverses some of the $CO_2$ capture. The system can mitigate this by operating the electrochemical cells at higher pressures relative to the partial pressure of $CO_2$.

Figure 3:
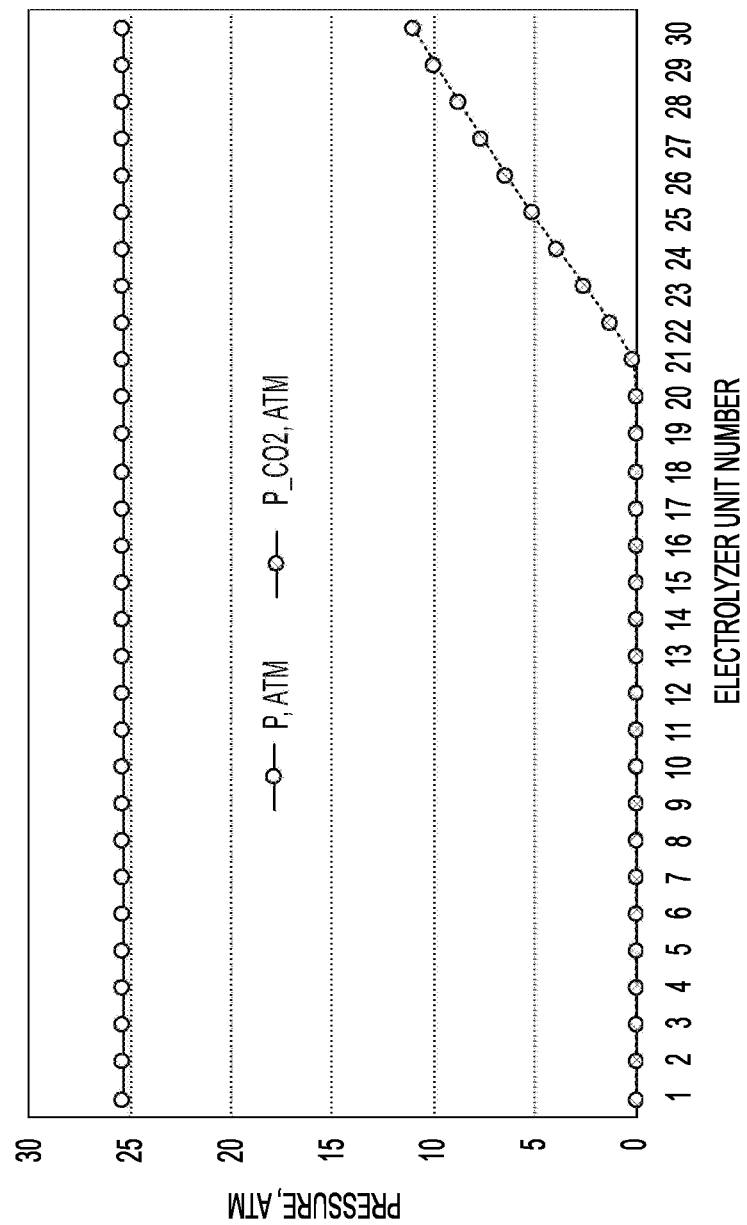
FIGS. 3-5 shows graphs of partial pressure of carbon dioxide in an acidifying stream, the corresponding cation concentration, and the corresponding pH, respectively.
Figure 4:
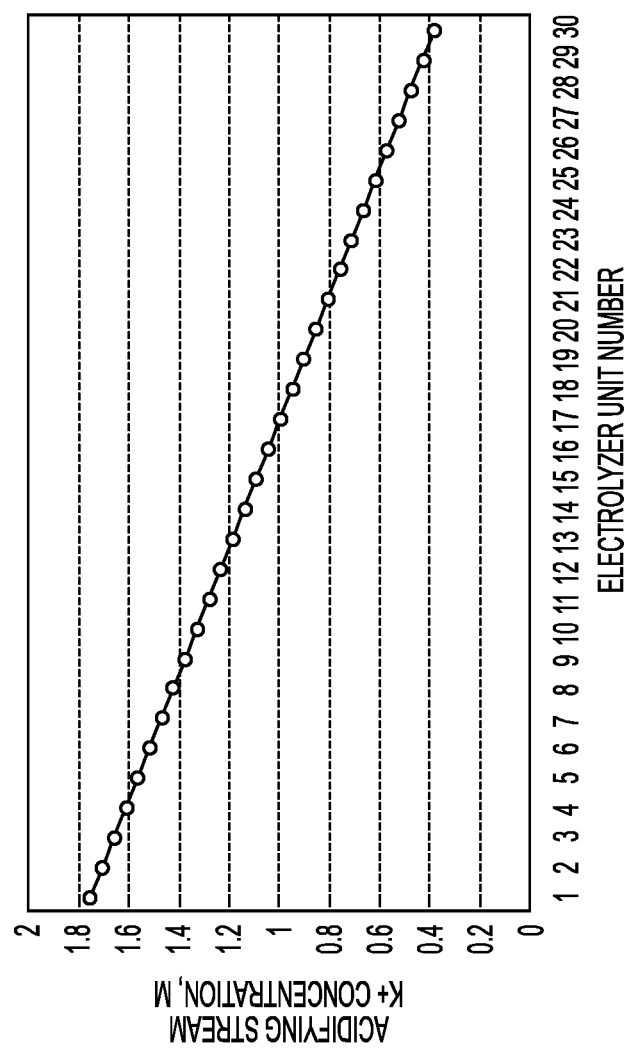
Figure 5:
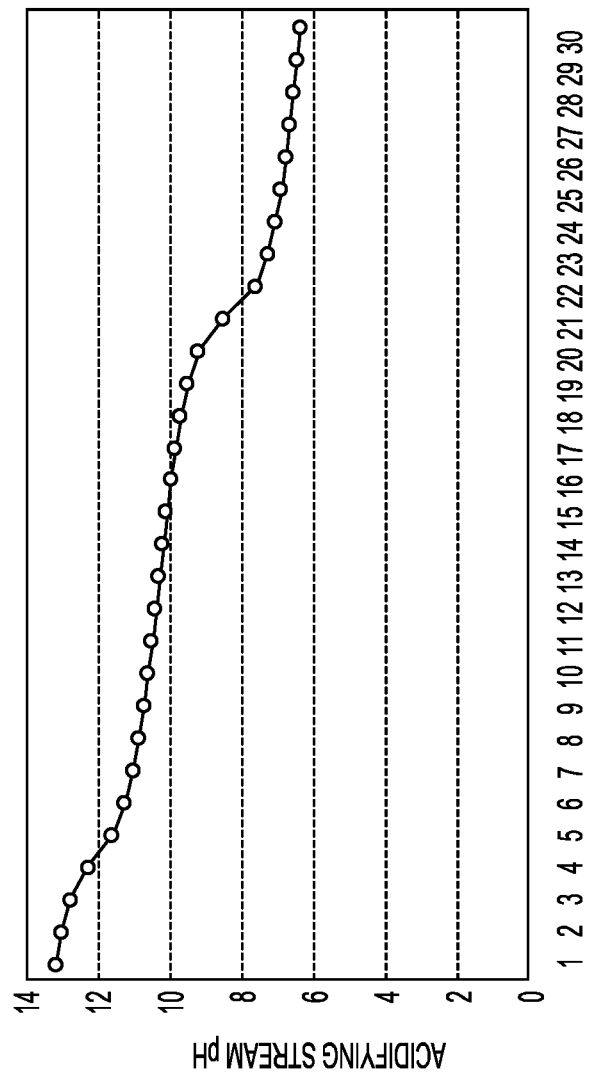

FIG. 3 shows a plot of the partial pressure of $CO_2$ in the acidifying $CO_2$-rich stream versus the electrolyzer unit number, for a chain of 30 electrolyzers in series and an input stream comprising 0.2 M $OH^-$ and 0.8 M $CO_3^{2-}$. As the $CO_2$-rich stream is acidified, the $K+$ concentration and pH decrease due to current in the electrolyzer, as shown in FIGS. 4 and 5. For each electrolyzer unit, the percentage of $CO_2$ in the oxygen head space is given by the ratio of $P_{CO2}$ to the total pressure $P_{total}$. The total pressure in the figure is set at 25.3 atm (25 bar) as an example. For this case, the area under the $P_{CO2}$ curve is 7% of the area under the 25.3 atm total pressure line, so the oxygen stream averaged over all electrochemical cells would be 7% $CO_2$ and 93% $O_2$.

For the process embodiment corresponding to FIGS. 3-5, there are 1 moles of $O_2$ produced for each mole of $CO_2$ captured. This means (7%/93%)=0.075 moles of $CO_2$ become entrained with the oxygen stream for each mole of $CO_2$ captured. In other words, the system would release ~7.5% of the $CO_2$ back into the ambient atmosphere if the oxygen stream were simply exhausted along with the $CO_2$.

From FIG. 1, there are 2 moles of $H_2$ produced for each mole of $O_2$. For the example process corresponding to FIGS. 3-5, there are 2 moles of $H_2$ produced for each mole of $CO_2$ captured. For reaction of $H_2$ and $CO_2$ to form water and methanol, the $H_2$:$CO_2$ stoichiometry is 3:1, so the current embodiment isolates more $CO_2$ than is needed to synthesize methanol using hydrogen. Excess $CO_2$ beyond that required for synthetic fuel can either be sequestered, meaning a negative emissions technology, or used to manufacture synthetic fuel with hydrogen generated in other processes.

Other pressures could be chosen, and more generally the pressure could differ for different electrolyzer. For example, above [K+]=0.65 M in the higher pH cells, the total pressure could be 1 atm without a significant amount of $CO_2$ getting entrained with the oxygen stream, since the $CO_2$ partial pressure in that range is negligible. The highest $P_{total}$ is only needed for the electrolyzer with the lower pH values.

Even if the oxygen in the embodiments represented by either FIG. 2 or FIG. 3 were exhausted to the environment with the entrained $CO_2$, there would still be more than enough $CO_2$ isolated to react with the generated $H_2$. Stoichiometrically, each mole of $H_2$ reacts with ⅓ mole of $CO_2$ in methanol synthesis. Embodiments of the process in FIG. 2 produces 1/1.3=0.77 moles of $CO_2$ for each mole of $H_2$ produced, about twice as much as is needed, so losing 10% of the captured $CO_2$ still leaves enough for both synthesis of liquid fuel from hydrogen and sequestration of additional $CO_2$, resulting in a negative emissions process.

There will be dissolved oxygen in the acidifying stream after all the electrolyzers, since oxygen has a non-zero solubility in water. However, the solubility of oxygen is much less than the solubility of $CO_2$. The Henry's law constant for oxygen in water is 769 atm/M, compared with 29.4 atm/M for $CO_2$. Much of the dissolved oxygen can be removed by venting the solution under pressure.

Another option is to use part or all the oxygen+$CO_2$ stream for oxycombustion, thereby reacting away the oxygen, and generating some power as well. Consider for example methanol synthesis from methane: $CH_4 + 2O_2 \rightarrow CO_2 + 2H_2O$. For each 2 moles of oxygen reacted, one mole of carbon dioxide from fossil fuel is created, but if the ratio of $CO_2$: $O_2$ in the input stream is greater than 1:2, the net effect can be less $CO_2$ in the environment.

In embodiments for efficient carbon capture, the basic solution for $CO_2$ absorption will be at a high enough pH that the dissolved carbon is mostly carbonate, instead of bicarbonate at lower pH. Stoichiometrically, this means at least two H+ ions need to be produced for each $CO_2$ molecule isolated. The consequence is at least one $H_2$ molecule generated for each $CO_2$ molecule isolated. For reaction of $H_2$ and $CO_2$ to form water and methanol, the $H_2$: $CO_2$ stoichiometry is 3:1, so embodiments with a $H_2$: $CO_2$ ratio less than 3:1 isolate more $CO_2$ than is needed to synthesize methanol using hydrogen. Excess $CO_2$ beyond that required for synthetic fuel can either be sequestered, meaning a negative emissions technology, or used to manufacture synthetic fuel with hydrogen generated in other processes.

The process requires catalysts that are effective at relatively mild pH, unlike traditional alkaline and acidic hydrolysis. As defined here, a mild pH is defined as a pH that is not highly corrosive, typically in the range between 4 and 12 pH. However, the corrosiveness may depend upon what is used as a catalyst. What may be considered corrosive for one catalyst may be above pH=11, but for another earth-abundant catalyst, the pH may go as high as 13-14 without being corrosive. At the other end of the pH range, electrolyzers for acidic electrolysis using sulfonated Nafion proton exchange membranes create a local environment of pH~0-3, so corrosion-resistant noble metal catalysts comprising Pt and other platinum group metals, for example, Ir and Ru oxide, are used; see, for example, Huynh, Michael, Tuncay Ozel, Chong Liu, Eric C. Lau, and Daniel G. Nocera. 2017, "Design of Template-Stabilized Active and Earth-Abundant Oxygen Evolution Catalysts in Acid", Chem. Sci. 8 (7): 4779-4794. The term 'earth-abundant' generally means those materials that are abundant in the Earth's crust.

Embodiments could use Pd-based, Pt-based and other precious metal-based catalysts. Alternative embodiments use catalysts made solely from earth-abundant materials. Most of the development work on water electrolysis catalysts made of earth-abundant materials has focused on acidic or alkaline electrolysis cells, but recently there is a growing body of work on mild pH catalysts. See, for example, I. Roger, M. Shipman, M. Symes, "Earth-abundant catalysts for electrochemical and photoelectrochemical water splitting," Nature Reviews: Chemistry, 2017, vol. 1, 1-13.

In each electrolyzer, the pH difference across the cell, the local pH drop across the membrane, is kept small, enabling energy and cost-efficient processing. In the limit of a large number of cells in series, the process would approach the efficiency of a 'plug flow' process. The process acidifies the carbonate stream for subsequent $CO_2$ desorption, basifies the return $CO_2$-poor stream so it can be used for more $CO_2$ absorption, and generates $H_2$.

To keep ΔpH small at the catalytic sites of water hydrolysis, the flow and mixing of the electrolytes is important. The mass transport of electrolyte components to the catalyzed electrode surface should not be limiting relative to the rate of catalysis, or else there will be buildup of H+ and OH− at the catalyzed electrode surface, i.e. an unwanted increase in ΔpH. Spacers between the electrode and the cation exchange membrane may be used to assure the desired environment at the catalyst surface, with a static mixing configuration to minimize any increase in $I^2R$ losses. Static mixing refers to structures put into a flow field that cause the flow to mix by forcing movement in different directions. These types of spacers are used in bipolar membrane electrodialysis units, for example. Other forms of mixing can also be used.

Referring back to FIG. 1, the exploded view shows the membrane 30 with spacers 36 and 38 in the first chamber 12 and the second chamber 20, respectively. The spacers allow the water to flow in such a manner that it comes in contact with the catalyst, which may be loaded on the electrodes 32 and 34, while also allowing ion transport through the membrane 30.

Figure 6:
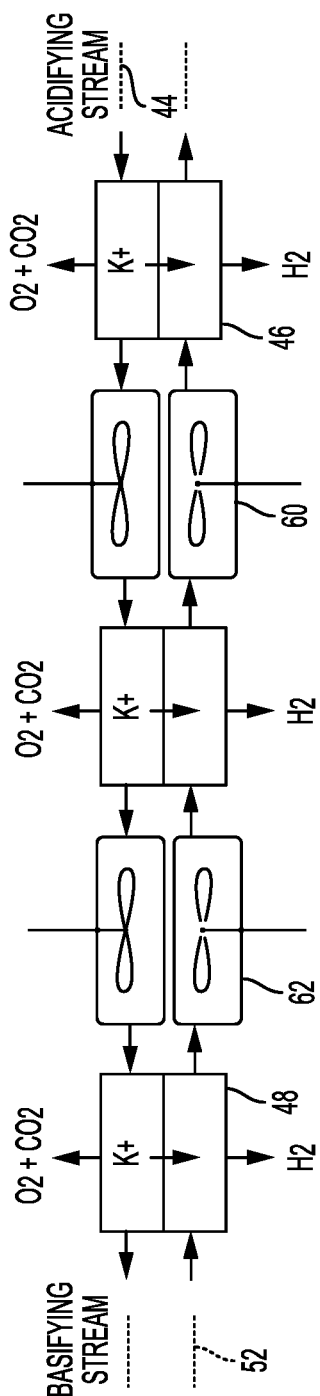
FIG. 6 shows another embodiment of an electrolysis system.

Inexpensive mixing vessels can be used between electrolyzer to allow more time for the reactions of carbonate and bicarbonate ions with H+ and OH−. Depending on the flow rates of a process, there may not be enough residence time in an electrolyzer for the desired extent of reaction. FIG. 6 shows an embodiment with mixing vessels between electrolyzers.

In FIG. 6, mixing vessels such as 60 are used between the electrolyzers on the $CO_2$-rich path. Because the flows are separated, other mixing vessels such as 62 would be used on the return $CO_2$-poor path. The $CO_2$-rich stream 44 would still enter the initial electrolyzer 46 and then flow to the mixing vessel 60, which would occur for some or all electrolyzers. Similarly, the return flow 52 would enter electrolyzer 48 and then mixing vessel 62, which would occur for some or all electrolyzers.

Figure 7:
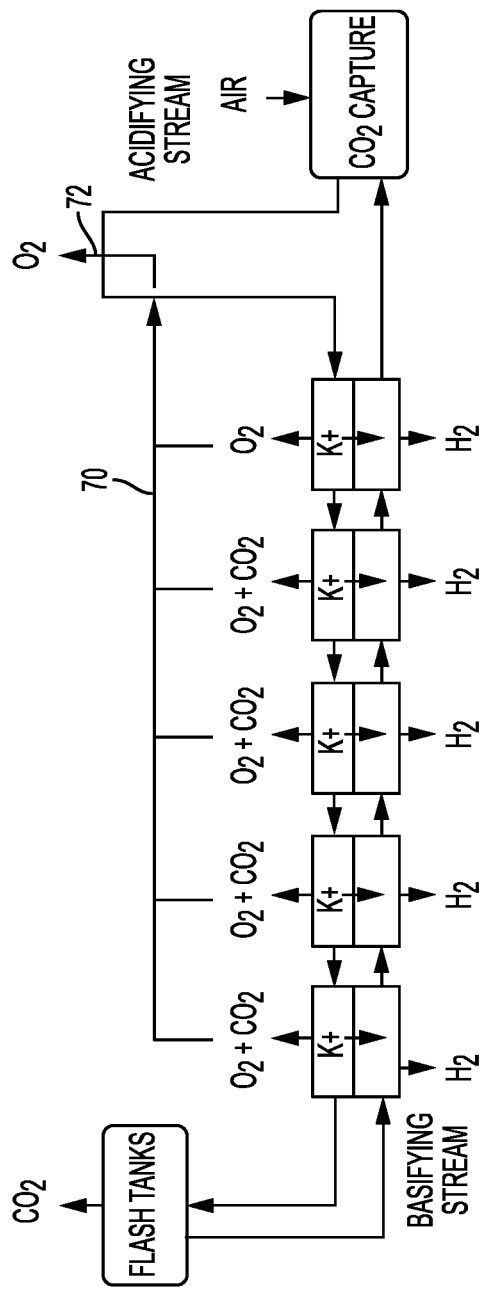
FIG. 7 shows another embodiment of an electrolysis system.

In another embodiment, oxygen from lower pH electrolyzers may be bubbled or otherwise purged through the acidifying stream of high pH cells before exhaust of the oxygen stream, to reabsorb some of the entrained $CO_2$ to the acidifying stream. As shown in FIG. 7, the $O_2$ is captured in path 70, an oxygen-removal conduit, and bubbled or otherwise contacted with the incoming alkaline capture stream, after which it can be exhausted to the ambient atmosphere at 72, or captured for oxycombustion, etc. The term 'oxygen-removal conduit' refers to any physical means for transporting oxygen away from electrolyzer cells.

In another embodiment, ionic conduction is increased by adding a salt that is not redox active. As used here, 'redox active' means that the salt does not undergo any reduction or oxidation reactions at the voltages or currents used to practice the embodiments. For example, $Na_2SO_4$, a readily available salt, could be added to a $NaOH/Na_2CO_3/NaHCO_3$ stream to increase the Na concentration and therefore the conductivity of Na. An increase in Na conductivity will lower the resistive loss, a component of the cell overpotential.

Many other variations and embodiments exist. For example, some or all the electrochemical cells could have an anionic exchange membrane instead of a cation exchange membrane. For cells with an anion exchange membrane, the intent is for the carbonate and bicarbonate ions to conduct across the membrane, or the anion from a salt that is not redox active. Anion exchange membranes may not be preferred at the highest pH values where the concentration of OH− is large enough to compete with the carbonate ions for conduction.

Additionally, the absorption of $CO_2$ into KOH is exothermic, and the electrochemistry in the embodiments here is endothermic. Embodiments could include heat transfer loops from the carbon capture unit operation to the electrochemical cells to transfer heat from the exothermic reaction.

As discussed above, countercurrent flow through electrolyzers in series can be used to lower the ΔpH across each electrolyzer cell membrane, to minimize the energy added to acidify and then basify the capture solution. The countercurrent flow can also be affected within an electrolyzer cell. FIG. 1 shows a countercurrent flow on either side of a membrane, for example. Even with as few as one electrolyzer, the flows through the electrolyzer can be engineered to reduce energy consumption, in accord with the embodiments.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of removing carbon dioxide from an atmosphere, comprising:
   capturing carbon dioxide from the atmosphere in an alkaline capture solution;
   sending the alkaline capture solution to a series of electrolyzers in a $CO_2$-rich path, wherein each electrolyzer raises the acidity of the input $CO_2$-rich solution to produce an acidified $CO_2$-rich solution;
   removing carbon dioxide from the acidified $CO_2$-rich solution at a carbon dioxide removal unit operation to produce a $CO_2$-poor solution;
   sending the $CO_2$-poor solution to the series of electrolyzers in a return path, wherein each electrolyzer raises the alkalinity of the return $CO_2$-poor solution to produce a basified $CO_2$-poor solution, wherein a difference in pH between the $CO_2$-rich solution and the $CO_2$-poor solution within each electrolyzer is less than 3; and
   returning the basified $CO_2$-poor solution to a carbon dioxide capture unit operation.

2. The method of claim 1, further comprising mixing an output of at least one electrolyzer in a mixing vessel to allow more time for reactions before flowing the solution into an input of a next electrolyzer in at least one of the series of electrolyzers in the CO2-rich path or the series of electrolyzers in the return path.

3. The method of claim 1, wherein the alkaline solution comprises at least one of the group consisting of: KOH; $KHCO_3$; $K_2CO_3$; NaOH; $Na_2CO_3$; and $NaHCO_3$.

4. The method of claim 1, further comprising capturing oxygen produced by electrolysis by one ore more of the electrolyzers in the $CO_2$-rich path combined with at least one of minimizing or reabsorbing entrained $CO_2$.

5. The method of claim 1, wherein capturing carbon dioxide from the atmosphere in the alkaline carbon solution comprises capturing carbon dioxide from the atmosphere in an alkaline capture solution having a pH of 14 or less, and wherein sending the alkaline capture solution to a series of electrolyzers in a $CO_2$-rich path does not reduce the pH in the system to less than 4.

6. The method of claim 1, further comprising controlling the pressures in the electrolyzers to be higher than a partial pressure of carbon dioxide in the $CO_2$-rich output solution.

7. The method of claim 1, further comprising lowering pressure in the carbon dioxide removal unit operation to drive carbon dioxide out of the $CO_2$-rich solution.

8. The method of claim 1, further comprising adding a salt that is not redox active to the alkaline capture solution.

9. The method of claim 1, further comprising using the carbon dioxide removed by the carbon dioxide removal unit operation and hydrogen produced by electrolysis by at least one of the electrolyzers to synthesize liquid fuels.

10. The method of claim 1, further comprising powering one or more of the electrolyzers using renewable electricity.

11. The method of claim 1, further comprising completing a circuit by conducting at least one of potassium or sodium ions through a cation exchange membrane in at least one of the electrolyzers.

12. The method of claim 1, wherein sending the CO2-poor solution to the series of electrolyzers in a return path, and sending the alkaline capture solution to a series of electrolyzers in a CO2-rich path comprises sending the $CO_2$-poor and alkaline input solutions into each of the electrolyzers as countercurrent flows.

13. The method of claim 1, further comprising limiting bubbling of $CO_2$ from the $CO_2$-rich solution anywhere but in the carbon dioxide removal unit operation.

14. The method of claim 1, further comprising reducing pressure in at least one of the electrolyzers to degas the $CO_2$ and using a flow resulting from reducing the pressure to power regenerators to drive electricity generation in tandem with reducing the pressure.

15. The method of claim 1, further comprising sequestering at least some of the $CO_2$ removed at the carbon dioxide removal unit operation.

16. The method of claim 1, further comprising venting the acidified $CO_2$-rich solution under pressure to remove oxygen.

17. The method of claim 1 further comprising using at least part of the acidified $CO_2$-rich solution for oxycombustion of oxygen and $CO_2$.

18. The method of claim 1, further comprising transferring heat from the carbon capture unit operation to one of more of the electrolyzers.

* * * * *